(No Model.) 2 Sheets—Sheet 1.
F. G. ECHOLS.
TOOL HOLDER.
No. 588,222. Patented Aug. 17, 1897.
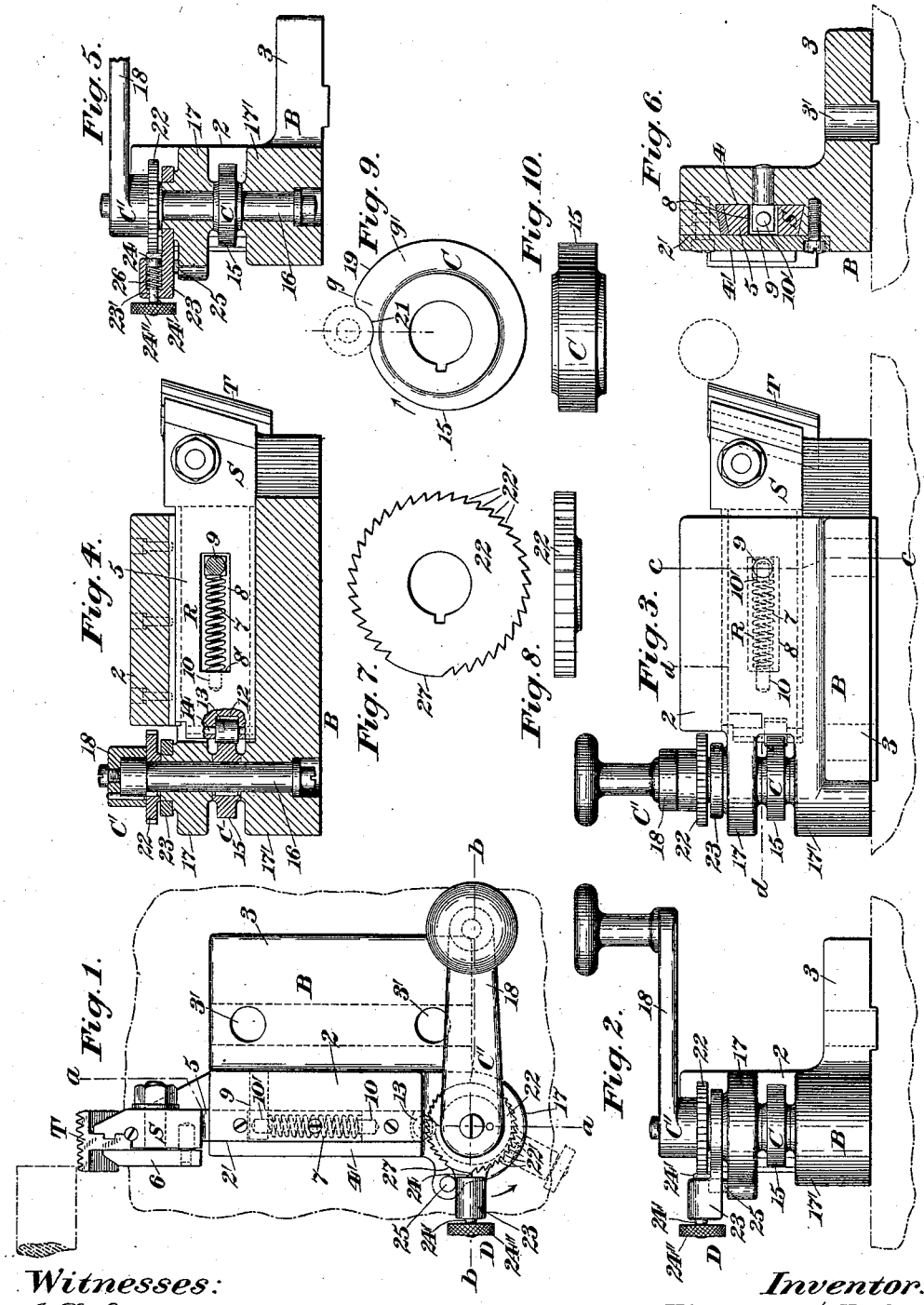
Witnesses:
J. L. Edwards Jr.
Fred. J. Dole
Inventor:
Frank G. Echols.
By his Attorney,
F. H. Richards.

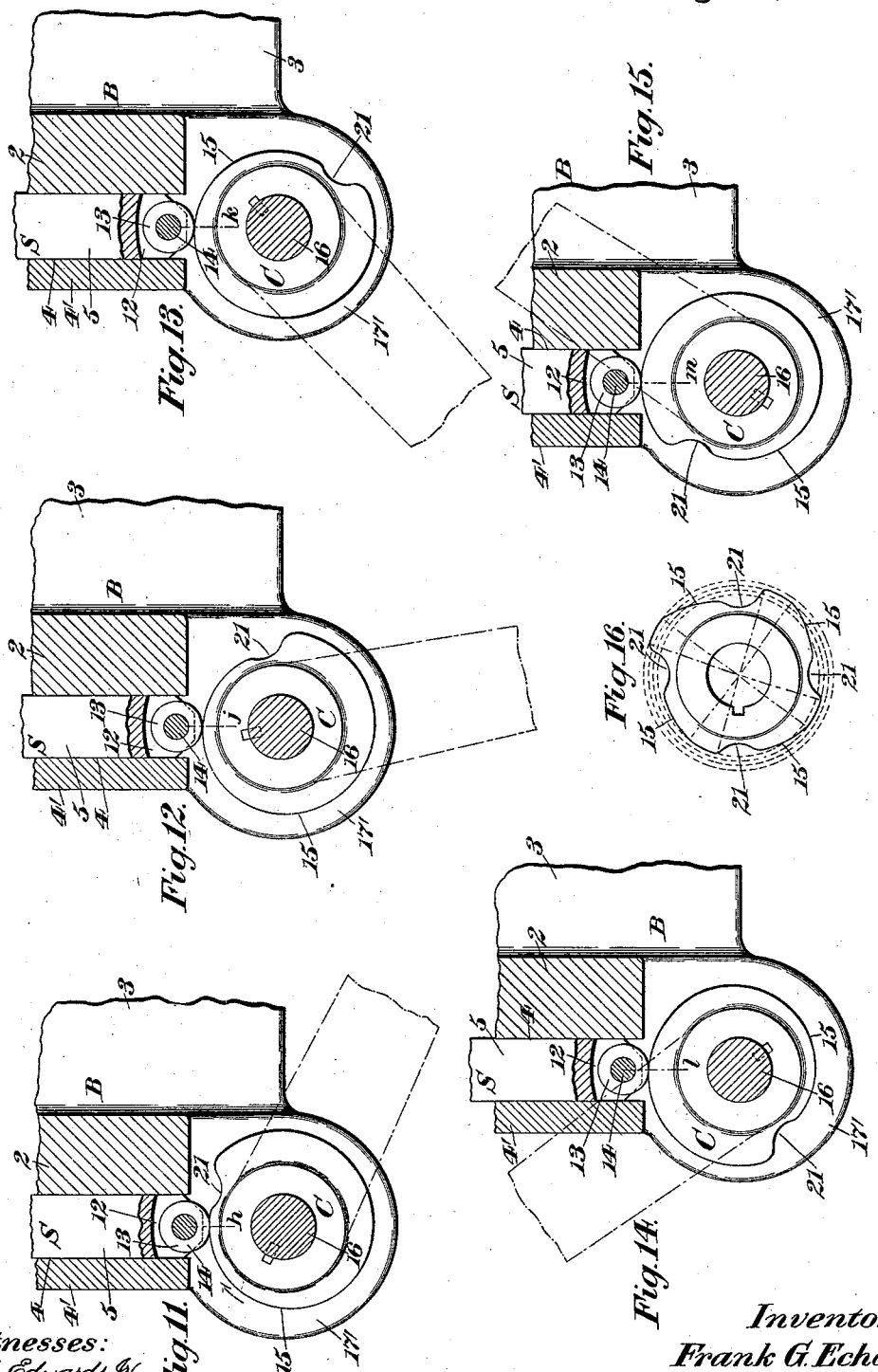

UNITED STATES PATENT OFFICE.

FRANK G. ECHOLS, OF HARTFORD, CONNECTICUT, ASSIGNOR TO THE PRATT & WHITNEY COMPANY, OF SAME PLACE.

TOOL-HOLDER.

SPECIFICATION forming part of Letters Patent No. 588,222, dated August 17, 1897.

Application filed January 25, 1897. Serial No. 620,589. (No model.)

*To all whom it may concern:*

Be it known that I, FRANK G. ECHOLS, a citizen of the United States, residing in Hartford, in the county of Hartford and State of Connecticut, have invented certain new and useful Improvements in Tool-Holders, of which the following is a specification.

This invention relates to tool-holders of that class especially adapted for use in connection with screw-cutting or engine lathes.

One object of the invention is to furnish a tool-holder of the class specified comprehending instrumentalities whereby a tool may be intermittently advanced and set with precision in predetermined successive positions for making successive cuts of predetermined depths and without the exercise of such skill or care as is required for adjusting the tool-carrying slide of a tool-holder of ordinary construction.

A further object of the invention is to provide in a tool-holder of the class specified a tool-carrying slide and hand-operable means for intermittently advancing said slide and tool to requisite positions for making successive cuts of predetermined depths, and also to provide, in connection with said slide, means for positively limiting each and every advancing movement thereof, to thus facilitate the work and at the same time render it impossible to carry the tool-carrying slide beyond the range of limit when making the final or finishing cut.

A further object of the invention is to furnish, in connection with a tool-holder, a reactionary tool-carrying slide, a slide-advancing cam, hand-operable means for operating said cam to impart advancing movements to the slide, an indexing device in connection with the cam-actuator and effective for indexing the position and limiting the successive advancing movements of the slide, and means for retracting said slide intermediate to the intermittent advancing movements thereof, whereby the indexing device may be arbitrarily set to control the range of movement of the cam-actuator, after which the cam-actuator will be advanced until arrested by the index device, which will bring the cutting-tool carried thereby into requisite position for making a cut of predetermined depth, after which or during the first cutting operation the index will be again set and the slide will be retracted to its original position and subsequently moved forward to the requisite indicated position in advance of the first cutting position for increasing the depth of the first cut, and so on up to the limit of movement of the slide.

In the drawings accompanying and forming part of this specification, Figure 1 is a plan view of a tool-holder embodying my present invention, a portion of the bed-plate or carriage of a lathe and a portion of a piece of stock to be operated upon being shown in dotted lines. In this figure the tool-holder is shown in its fully-retracted position, the index pin or pawl of the index device and the carrier therefor being shown in two positions in full and dotted lines, respectively. Fig. 2 is an end elevation of the tool-holder as seen from below in Fig. 1. Fig. 3 is a side elevation of said tool-holder as seen from the right in Fig. 2. Fig. 4 is a longitudinal section of the tool-holder, taken in dotted line *a a*, Fig. 1, and as seen from the right in said figure. Fig. 5 is a vertical cross-section of the tool-holder, taken in a line corresponding to the dotted line *b b*, Fig. 1. Fig. 6 is a cross-sectional view of the tool-holder, taken in dotted line *c c*, Fig. 3, looking toward the right hand in said figure. Figs. 7 and 8 are plan and edge views, respectively, of the index wheel or ratchet. Fig. 9 is a plan view of one form of slide-advancing cam, said figure showing the cam with a relief depression or let-off formed in the working face thereof and showing the bearing-roll of the tool-carrying slide seated in such depression, said roll being shown in dotted lines. Fig. 10 is an edge view of the cam as seen from below in Fig. 9. Figs. 11, 12, 13, 14, and 15 are enlarged horizontal sections taken on lines corresponding with the dotted line *d d*, Fig. 3, looking downward in said figure and showing, respectively, five successive positions of the slide-actuating cam and slide and showing the cam-actuator in dotted lines, said figures being intended to represent five successive positions of the cam and slide of the tool-holder during the operation of making five successive cuts; and Fig. 16 is a plan of a slightly-modified form of cam.

Similar characters designate like parts in all the figures of the drawings.

My improved apparatus, which for convenience is herein termed a "tool-holder," comprises, in the preferred form thereof, (illustrated in Figs. 1 to 6 of the drawings,) a tool rest or base, (designated in a general way by B,) a tool-carrying slide S, supported for movement in a horizontal plane on the base, a retracting device R in connection with said slide, a slide-actuating cam C in operative relation with and operative for advancing said slide, a cam-actuator C', and an indexing device (designated in a general way by D) in connection with and adapted for indexing successive positions of the cam and embodying means for limiting the slide-advancing movement of the cam-actuator.

The tool rest or base B of the tool-holder, which may be of any suitable general construction, is shown in the nature of a block comprising the main body portion 2, having a horizontally-disposed bottom flange 3, whereby the same may be fixed to the carriage or bed of a lathe, preferably by means of screws, (not shown,) which may extend through the screw-holes 3' in said flange. It will be obvious, however, that the tool-holder may be attached to the carriage or bed of a lathe in any suitable manner.

In the side face 2' of the body portion 2 of the tool-rest B is formed a slideway 4, in which is seated the tool-carrying slide S, the slideway being protected against entrance of dirt by a face plate or strap 4', which is fixed to the side face 2' of the tool-rest by screws in the usual manner of attaching such plates. The slideway 4, which is preferably dovetailed, is open at opposite ends thereof, as shown most clearly in Fig. 4.

The tool-carrying slide, which may be of any suitable general construction, preferably comprises a dovetailed plate 5, set up edgewise in the slideway 4, and which plate is provided at the forward end thereof with a tool-clamp 6, which may be of any suitable construction for holding a tool, such as the chaser T. (Shown most clearly in Fig. 1 of the drawings.)

As a convenient means for automatically effecting a retractive movement of the tool-carrying slide I have provided, in connection with said slide, a slide-retracting device R, which is shown as a spiral spring 7, seated in a longitudinal mortise 8 in the slide, which spring abuts at its end against the end wall 8' of the mortise and at its outer end against an abutment or stud 9, fixed to the body portion 2 of the tool-rest and extending into said mortise, the opposite ends of the spring being held against lateral displacement, preferably by pins 10 and 10', carried, respectively, by the slide and stud and entering the end coils of the spring.

As shown most clearly in Figs. 1, 3, and 4 of the drawings, the inner end of the tool-carrying slide S is slotted longitudinally at 12 and is furnished with a bearing-roll 13, mounted on a stud or pin 14, journaled in suitable bearings in this end of the slide, the function of which roll will be hereinafter fully described.

For the purpose of actuating the tool-carrying slide to impart advancing movements thereto I have provided, in operative relation with the bearing-roll 13 of said slide, a slide-actuating cam C, the working face 15 of which bears against the face of the bearing-roll 13. It will be obvious, however, that the roll 13 might be dispensed with and that the cam could have a bearing directly against the end of the slide, although it is preferable to employ a roll for the purpose of reducing friction.

The slide-actuating cam C in the organization thereof shown in the drawings is of the "rotatable" type and is fixed to a stud 16, journaled in vertical bearings 17 and 17' at the inner end of the tool-rest B, and which stud constitutes one member of the cam-actuator C'.

It is desired to state in the above connection that I do not limit myself to the employment of a rotatable cam in connection with the tool-carrying slide, nor do I desire to limit myself to the particular construction of cam or the particular organization of the cam and cam-actuator shown, as these may be variously modified and still be within the purview of my invention.

In the form thereof shown most clearly in Figs. 1 to 5, inclusive, and 9 to 15, inclusive, of the drawings the slide-actuating cam C has a spirally-disposed slide-advancing face or working face 15, and said cam is fixed in a horizontal position upon the cam-carrying stud or actuating-shaft 16, with its working face in juxtaposition to the inner end of the tool-carrying slide S, said cam being adapted to be rotated in a plane corresponding to the plane of longitudinal movement of the slide and said slide being held by means of the retracting device R, with the face of the roll 13 in constant engagement with the working face 15 of said cam.

In practice where a spiral cam such as that shown in Fig. 9 is employed in connection with the tool-carrying slide the working face 15 of said cam will be of such gradual inclination that it will be impossible for the reactionary thrust of the tool-carrying slide, due to the stress of the retracting device, to impart a rotative movement to said cam, no matter at what point on the working face 15 of the cam said roll 13 bears. In other words, the thrust of the tool-carrying slide will be exerted on the cam in a plane substantially at right angles to the plane of that portion of the working face against which the roll 13 bears, and in the organization shown most clearly in Figs. 1, 4, and 9 said thrust will be exerted in a plane radial to the axis of said cam.

The cam-actuator C', in the preferred form thereof shown in the drawings, comprises the cam shaft or stud 16 and the hand-lever 18, fixed to the upper end of said shaft.

For the purpose of insuring uniformity in the successive operations of the device the cam C has one portion of its working face—as, for instance, that portion 19 located between the radial dotted lines $g$ and $g'$—formed without any inclination relatively to the line of movement of said cam—that is to say, if a rotatable cam such as shown in Fig. 9 of the drawings is employed that portion 19 of the working face of said cam will be concentric to the axis of movement thereof. If a sliding cam be used, the working face of said cam will have one portion thereof in parallelism with the line of its longitudinal movement. This non-inclined portion 19 of the working face of the cam will preferably be located contiguous to or constitute part of the highest portion of the cam, or that portion of the working face that determines the stroke limit of the tool-carrying slide. This peculiar construction of the cam enables the workman to operate the same with less care and obviates the possibility of changing the limit of movement of the tool by advancing the cam beyond the proper predetermined point for finishing the cut.

In Fig. 16 of the drawings I have shown a slightly-modified form of rotatable cam. This cam is shown having a series of successive stops or working faces 15, each of which has one portion thereof formed without any inclination relatively to the line of movement of the cam.

For the purpose of facilitating the retractive movement of the tool-carrying slide S to give a definite relief or space between the work and the point of the cutting-tool the cam has formed in the lowest portion of the working face thereof a depression 21 of sufficient depth to insure, when the bearing-roll 13 of the tool-slide is seated in such depression, the requisite relief or space between the work W and the point of the cutting-tool.

When the work is ready for beginning the cut, the operator advances the cam in the direction of the arrow in Fig. 11 by means of a prolonged rotation of the hand-lever 18 to thereby force the bearing point or roll 13 out of the depression 21 and up to the predetermined point—such, for instance, as the point designated by the radial line $h$ in said Fig. 11—at which the cutting-tool will be forced forward far enough to take a proper first cut.

For taking the successive cuts the cam will be advanced to bring the successive points (designated by $j$, $k$, $l$, and $m$, Figs. 12, 13, 14, and 15, respectively) into bearing engagement with the roll 13, which forces the tool-slide S forward to successive advanced positions for making successive cuts of predetermined depths.

As a means for indexing and limiting the successive advancing movements of the cam to thereby insure precision in the successive adjustments of the tool-carrying slide relatively to the work for making the cuts of predetermined depths I have provided in connection with the cam an indexing device, which in the preferred form thereof (shown most clearly in Figs. 1 to 5 of the drawings) comprises an indexing-wheel 22, which is shown keyed to the cam-carrying stud 16 near the upper end thereof, and which index-wheel has a series of index-notches 22' in the periphery thereof, an index-pin carrier 23, supported for rotative movement with relation to the cam-carrying stud, an index-pin 24, carried by the index-pin carrier in position to engage in successive notches of the index-wheel 22, means for retaining the index-pin in normal engagement with a notch of the index-wheel, and a stop-abutment 25 for limiting the advancing movement of the index-pin carrier.

In the form thereof shown in Figs. 1 to 5 of the drawings the index-wheel is shown in the nature of a ratchet-wheel and the index-pin is shown as a pawl adapted to engage in a tooth-notch.

The index-pin is shown having a stem 24' of relatively small diameter, as compared with the diameter of the working end of said pin, and which stem is journaled for reciprocatory movement in a horizontal bearing 23' in the outer end of the pin-carrier 23. The means for retaining the index-pin in normal effective engagement with the index-wheel is shown as a spiral spring 26, surrounding the stem of the index-pin and bearing at the outer end thereof against the wall of the bearing 23' and at the inner end thereof against the enlarged portion of the index-pin. This index-pin is also preferably provided with a knob 24'', whereby the same may be retracted with its working end out of engagement with the index-wheel to facilitate the adjustment of the index-pin from one notch to another in position to indicate the next effective movement of the cam C.

It will be noticed by reference to Fig. 7 that the index-wheel has a portion of its perimeter, as 27, formed without index-notches, which portion is so located with reference to the non-inclined portion 19 of the working face of the cam C that when this portion of said cam is contiguous to the bearing-roll 13 of the tool the non-notched portion 27 of the index-wheel will be contiguous to the working end of the index-pin 24, and when in this position the cam and index-wheel may have a limited amount of movement, backward and forward, without effecting any change in the advanced position of said slide.

To advance the tool-carrying slide intermittently to successive positions for making successive cuts of predetermined depths, assuming the parts of the tool-holder to be in the positions illustrated in full lines in Fig. 1, with the cam-actuator and tool-carrying slide in their fully-retracted or normal inoperative positions, the operator will first retract the index-pin from engagement with the first index-notch, move the index-pin carrier in the direction of the arrow in Fig. 1 to cause the index-pin to engage in a succeeding index-notch of the index-wheel located at the requisite distance from the first-mentioned notch for determining the effective movement of the cam and the advancing movement of the tool-carrying slide, after which the hand-lever 18 will be advanced from its normal retracted position until its movement is arrested by the index-pin carrier coming into contact with the abutment 25—that is to say, the hand-lever 18 may be shifted from the position shown in Fig. 1 to that shown in Fig. 11, which will advance the cam sufficiently to set the tool-carrying slide at the requisite position for the tool thereof to make a cut of proper depth. On finishing this cut the hand-lever 18 is retracted to the original position, (shown in Fig. 1,) so as to effect a retractive movement of the tool, said tool being retracted by means of the device R. The index-pin is then disengaged from the notch in which it is seated and reëngaged with another notch of the index-wheel, and the hand-lever is again moved forward—as, for instance, from the position shown in Fig. 11 to that shown in Fig. 12—until the index-pin carrier again comes into engagement with the abutment 25, which advancing movement of the hand-lever carries the tool forward to the proper position for making the next succeeding cut of the requisite depth. By thus continuing these operations the tool is gradually advanced to its predetermined forward limit, when the bearing-roll 13 of the tool-slide will rest against the limiting-face 19 of the cam, and thus produce strict uniformity in successive screws or other articles being threaded or turned.

It will of course be understood that the tool-holder will be shifted longitudinally of the work on the carriage of the lathe in the usual manner and intermediate to successive cutting operations.

It will furthermore be understood that any desired form of tool may be used in connection with the tool-carrying slide, and therefore I do not desire to limit the invention to a tool-holder embodying any particular kind of tool.

In practice different forms of index-wheels—that is, index-wheels having different numbers of teeth corresponding to the different distances it is desired to advance the tool-carrying slide at each successive movement—may be employed, and it will of course be understood that cams having working faces of different inclinations or effective heights may be used for advancing the tool-carrying slide to any distance within the cam limit.

The cam illustrated in connection with the tool-holder shown in Figs. 1 to 5, inclusive, may be replaced by other suitable cams having working faces shaped and proportioned for setting the tool of the tool-carrying slide to take predetermined successive cuts, one such cam being shown in Fig. 16, in which the working face is divided into successive portions, each being for a part of its length eccentric and for another portion of its length concentric with the axis of the cam, and each portion having a depression at the lowest part thereof for permitting a retractive movement of the tool-carrying slide. In practice a cam having any number of such working-face portions may be used, but of course the working face must correspond with the number of successive tool positions required in any particular case.

It will be understood that in some cases the indexing device, which is also in the nature of a stop device, may be omitted, especially when a cam such as shown in Fig. 16, having successive stepped portions, is employed, in which case the operator must be depended upon to set the hand-lever in proper successive positions for advancing the slide the requisite distance for making the proper cut, which may be done by a competent workman with facility, especially if said successive stepped portions are not too finely graduated.

Having described my invention, I claim—

1. A tool-holder comprising a reactionary tool-carrying slide; means including a cam, for shifting said slide; and an adjustable stop device in connection with, and effective for controlling the range of each successive movement of, the cam.

2. A tool-holder comprising a shiftably-supported tool-carrier; hand-operable means including a cam for advancing said carrier; an adjustable stop device for controlling the range of successive movements of the cam; and a retracting device in connection with, and effective for retracting, said carrier.

3. A tool-holder comprising a tool-carrying slide; a cam for advancing said slide; hand-operable means for actuating the cam intermittently to bring different portions thereof in position to advance the carrier successive predetermined distances, respectively; indexing mechanism for indicating the different positions of the cam, and embodying instrumentalities for limiting the successive intermittent movements thereof; and means for retracting the slide.

4. A tool-holder comprising a tool-carrying slide; a cam in operative relation with said slide; a cam-actuator; and an indexing device in connection with, and adapted for indicating, the range of each movement of the cam-actuator.

5. The combination of a reactionary tool-carrying slide; a cam in operative relation with said slide; a cam-actuator; and an indexing device in connection with, and adapted for indicating the range of movement of, the slide-advancing cam.

6. The combination, with a shiftable tool-carrier, of a cam in operative relation with the tool-carrier and having a working face one portion of which is non-inclined with relation to its line of movement; means for actuating the cam; means for retaining the slide in engagement with the working face of said cam; and an adjustable stop device for limiting the range of movement of the cam.

7. The combination, with a reactionary tool-carrying slide, of a rotatable cam having an eccentric working-face portion for imparting an advancing movement to the slide and also having a concentric working-face portion for limiting the range of movement of said slide; actuating means in connection with said cam; and an adjustable stop device in connection with the cam-actuating means and effective for indicating and limiting the range of movement of said cam.

8. The combination, with a shiftable tool-carrier, of a cam in operative relation with the tool-carrier and having a working face one portion of which is non-inclined with relation to the line of its movement; means for actuating the cam; means for retaining the slide in engagment with the working face of said cam; and an indexing device in connection with, and effective for regulating the advancing movements of, said cam.

9. The combination, with a base having a horizontal slideway, of a tool-carrying slide supported in said slideway; a cam in operative relation with the inner end of the slide and having a working face for advancing said slide; a retracting device for retaining the slide in bearing engagement with the cam; actuating means in connection with said cam; and a shiftable stop device for indicating and limiting the effective movements of said cam.

10. The combination, with a tool rest or base having a horizontal slideway, of a reactionary slide supported in said slideway; a tool carried at the outer end of said slide; a bearing-roll rotatably supported at the inner end of said slide; a cam-supported stud journaled in the tool rest or base; a cam fixed to said stud and having a working face in engagement with the bearing-roll; a hand-lever fixed to the cam-carrying stud and adapted for imparting rotative movements to said cam, to advance the slide; and an indexing device, one part of which is carried by the cam-carrying stud, and which indexing device is adapted for indicating and limiting successive movements of the slide-actuating cam.

11. A tool-holder embodying a slide-actuating cam having successive working-face portions of successively-increased radii, and each working-face portion being, for a part of its length, eccentric to the axis of the cam and, for another part of its length, concentric to such axis, and each face portion also having a depression which extends inward beyond the working face of that portion of the cam having the least radius.

12. The combination, with a tool-carrying slide and its support, of a cam-carrying stud journaled in said support; a cam fixed to said stud and having a working face in operative relation with the slide and adapted for advancing said slide; a hand-lever fixed to the cam-carrying stud; an indexing-wheel fixed to said stud; an index-pin carrier shifted about said stud and having an index-pin adapted for engaging the index-wheel; a stop-abutment located in the path of movement of the index-pin carrier; and retracting means in connection with the slide.

13. The combination, with a tool-carrying slide and its support, of a cam one portion of the working face of which is inclined with respect to the line of movement of said cam and another portion of the working face of which is parallel or non-inclined with relation to the line of movement of said cam, and which cam also has a depression that extends below the working face of said cam between the inclined and non-inclined portions thereof; means for retaining the slide in working engagement with the working face of the cam; means for actuating said cam; and an adjustable stop device for indicating and limiting the range of movement of said cam.

14. The combination, with a tool-carrying slide, of a rotatable cam having eccentric and concentric working-face portions and having a depression formed in that end of the eccentric portion that has the least radius; means for retaining the slide in operative engagement with the cam; means for rotating said cam; an index-wheel fixed to rotate with the cam and having index-pin notches in the periphery thereof; a shiftably-supported index-pin carrier having an index-pin adapted for engaging notches in the index-wheel and for indicating the movements of the cam; and a stop-abutment located in the path, and adapted for limiting the movement of, the index-pin carrier.

15. The combination, with a reactionary tool-carrying slide and its support and with a cam-carrying stud journaled in said support; a cam in operative engagement with said slide and having that portion of its working face that is of greatest height formed concentric to the axis of movement of said cam and also having a depression adjacent to said concentric portion for facilitating a retractive movement of the slide; a hand-lever fixed to the cam-carrying stud; a peripherally-notched index-wheel fixed to the stud and having one portion of its perimeter non-toothed concentric to its axis to correspond to the concentric portion of the cam; and an index-pin carrier supported for movement about the cam-carrying stud and having a reactionary index-pin in normal engagement with a notch of the index-wheel and adapted to engage in successive index-notches to determine the effective movement of the cam.

FRANK G. ECHOLS.

Witnesses:
GEO. A. REYNOLDS,
L. W. PARKER.